April 28, 1953
C. E. MORGAN
2,636,614
RACK FOR HOLDING SLIDES
Filed Oct. 2, 1948
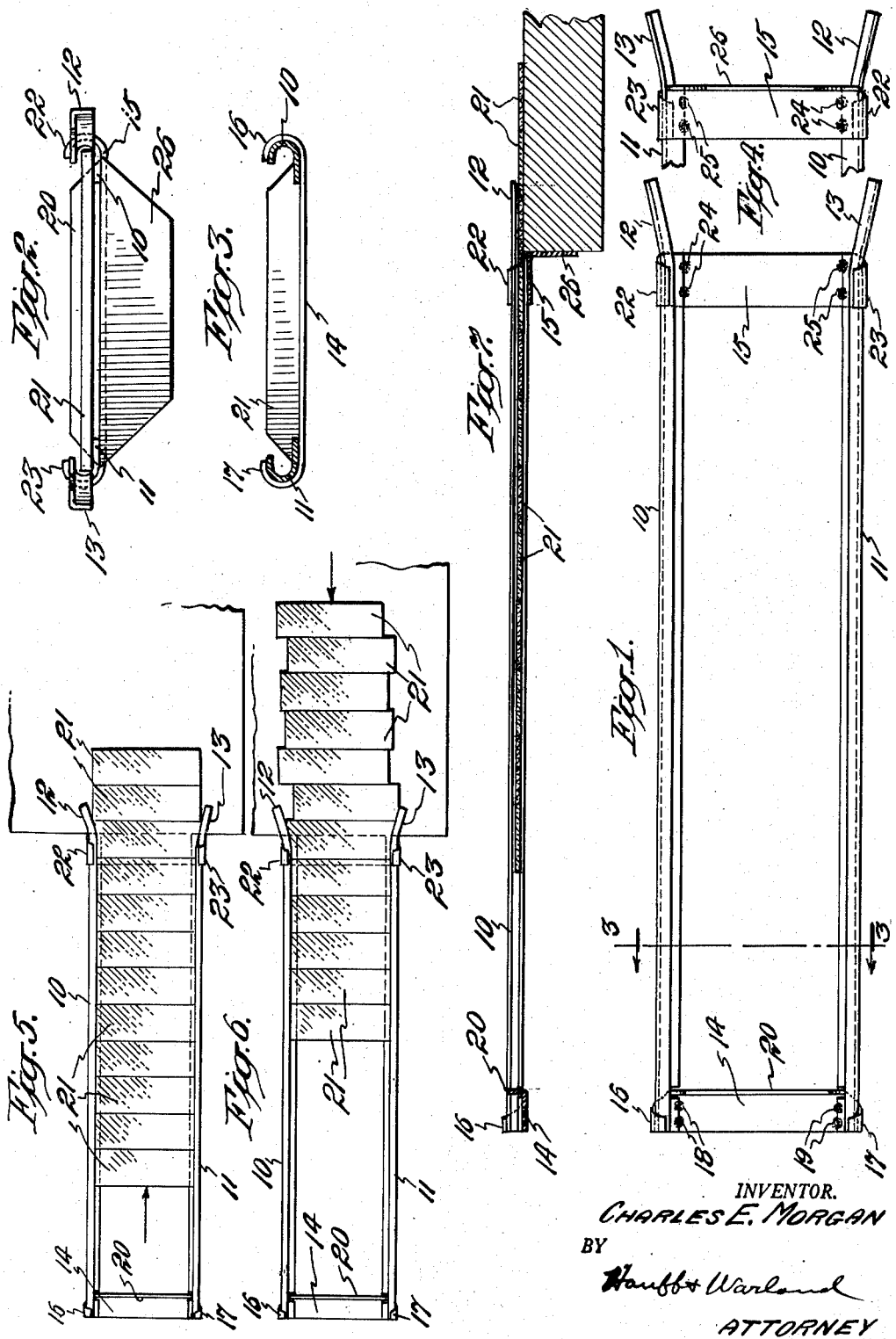
INVENTOR.
CHARLES E. MORGAN
BY
ATTORNEY Patented Apr. 28, 1953

2,636,614

UNITED STATES PATENT OFFICE 2,636,614

RACK FOR HOLDING SLIDES

Charles E. Morgan, West Hempstead, N. Y.

Application October 2, 1948, Serial No. 52,580

2 Claims. (Cl. 211—49)

The present invention relates to a novel device having particular utility as a holder for the storage and orientation of elongated panels or the like. Although the invention will be described in connection with microscope slides, it will be appreciated that in its broader aspects the invention is not limited to this application and may be advantageously utilized in any case where a series of panels are to be adjacently arranged in a holder for displaying signs, indicators, stock exchange cards or the like and for arranging and orienting plates of manually operated addressograph machines.

The invention finds especial utility in the handling of microscope slides in a laboratory where a large number of slides are used daily and considerable time is ordinarily lost in arranging slides for the reception of specimens and in individually washing each slide. These slides are in the form of rectangular glass panels which must be individually handled and precautions taken against scratching which occurs when a large number of slides are subjected to a washing operation. This continual scratching interferes with the examination of preparations under the microscope mounted on the slides and eventually results in the slides becoming unusable and must be discarded after a few months of service. When the slides are handled individually considerable breakage may result.

In the handling of elongated panels such as microscope slides it is frequently desirable to orient the panels relative to one another and to maintain this orientation. When the panels are handled individually it is often difficult to maintain the desired orientation.

It is the main object of the present invention to provide a holder for a series of panel members or the like wherein the panels may be removed and reinserted into the holder as a group.

Another object of the invention is to provide an improved holding device for microscope slides or the like wherein the slides may be readily oriented and returned to the holder.

A further object of the invention is to provide a device of the foregoing character for holding a plurality of microscope slides for washing, drying and storage purposes and wherein the slides are easily removed from and returned to the holder.

Other advantages and objects of the invention will become increasingly apparent on perusal of the following description in conjunction with the accompanying drawing wherein:

Figure 1 is a plan view of my improved form of holder.

Figure 2 is a view from the right end of Fig. 1 with slides mounted in the holder.

Figure 3 is a view of the device on the line 3—3 of Fig. 1.

Figure 4 is a fragmentary view of the open end of the device on the opposite side from that shown in Fig. 1.

Figure 5 is a plan view of my device showing a plurality of slides being removed as a group.

Figure 6 is a similar view of the device showing the manner in which the slides are returned to the holder from a tabletop or the like, and Figure 7 is a longitudinal section showing my device in operation.

In accordance with the present invention, I provide two channel shaped members connected together in the manner of a frame and having divergent extensions protruding from a stop member adapted to engage the edge of a table or of the flat surface whereby when the device is positioned adjacent the edge thereof a plurality of panels may be removed as a group, reoriented in any desired manner and returned to the holder or rack as a group without being handled individually.

The frame is provided with means for positioning the upper surfaces on the lower legs of the channel members in approximately the same plane as the flat table surface so the panels may be readily removed as a group while the frame is positioned against the table edge. This may be done by cutting away the lower edges of the divergent extensions for the channel members in approximately the same plane as the upper surfaces on the lower legs of the said channel members.

Referring more specifically to the drawing, my device is illustrated as comprising a pair of channel shaped members 10 and 11 of stainless steel, plastic or other suitable materials having divergent extensions 12 and 13 and connected together in the manner of a frame by end plates 14 and 15. The opposite extremities of the end plate 14 are curved at 16 and 17 to restrain outward movement of the channel members 10 and 11 and the end plate 14 may be spot welded to said channel members as at 18 and 19. The longitudinal edge of the end member 14 is bent upwardly to form an end barrier 20 for a plurality of panels 21 such as microscope slides or the like as shown in Figs. 1 and 7. The transverse plate 15 at the opposite end of my holder is similarly curved at the extremities as at 22 and 23 to restrain outward movement of the channel members 10 and 11 and may be spot welded to said channel members at 24 and 25 as shown in Fig. 1. The longitudinal edge on the right side of plate 15, as viewed in Fig. 1, is bent downwardly at an angle of ninety degrees to provide a stop flange 26 adapted to engage the edge of a table or similar flat surface as shown more particularly in Fig. 7 of the drawings.

Preferably the divergent extensions 12 and 13 of channel members 10 and 11 are in the form of half channels as shown best in Figs. 2 and 4 so that when the device is positioned adjacent the edge of the table, as shown in Fig. 7, the extensions 12 and 13 will overlie the edge of the table and position the device in such a manner that the upper surface of end plate 15 is in the same plane as the surface of the table.

It will be readily understood from the foregoing that in use my device is adapted to slidably receive a plurality of juxtaposed panels or slides so that the ends of the panels slide freely in the channel members 10 and 11 until the first panel engages end barrier 20 whereupon said panel members become positioned within the holder. When it is desired to select a particular panel from the holder the device is positioned adjacent a table edge, as shown in Fig. 7, and the whole tier of panels removed as a group as illustrated in Figs. 5 and 7 of the drawing. When so removed the individual panels may be removed or substituted and the entire group of panels then returned to the holder as shown in Fig. 6, the divergent extensions 12 and 13 serving to funnel the panels into alignment with the panel channel members 10 and 11.

It will be appreciated that my device provides a holder that contains the slides at all times except when they are in actual use and from which the slides are quickly and easily transferred to and from a work table as a group. Further, the slides may be arranged in any desired orientation with the cavities on the right side and where numbered slides are used the numbers may be arranged in the proper sequence. The slides are thus protected from breakage and positioned in a holder wherein they may be cleaned as a unit without becoming scratched by movement relative to one another.

The device, in addition, has many advantages and uses which will be obvious to those skilled in the art.

I claim:

1. A panel holder comprising a frame including parallel opposed channel members each having inwardly directed legs and having lower legs and forming a slide closed at one end and terminating in open divergent extensions at the opposite end, means associated with said divergent extensions for positioning the upper surfaces on the lower legs of the channel members relative to a table edge so that when the frame is positioned adjacent the table edge the panels may be removed therefrom onto the table and when returned are aligned and directed into the opposed channels of the frame.

2. A panel holder comprising a frame including parallel opposed channel members each having inwardly directed legs and having lower legs and forming a slide closed at one end and terminating in divergent open extensions at the opposite end, a flange extending downwardly from the lower portion of the frame adjacent the inner ends of said divergent extensions forming a stop member to position said frame on a table edge with the divergent extensions protruding over said table edge, the bottom edges of said extensions being in approximately the same plane as the upper surfaces on the lower legs of the said channel members, whereby panels mounted within the frame may be removed therefrom and returned as a group.

CHARLES E. MORGAN.

References Cited in the file of this patent

UNITED STATES PATENTS

| Number | Name | Date |
| --- | --- | --- |
| 655,739 | Runtz | Aug. 14, 1900 |
| 1,223,637 | Swain | Apr. 24, 1917 |
| 1,298,993 | Meyer | Apr. 1, 1919 |
| 1,472,129 | Meixell | Oct. 30, 1923 |
| 1,512,395 | Brigel | Oct. 21, 1924 |
| 2,303,976 | Bawcutt et al. | Dec. 1, 1942 |
| 2,460,871 | Caldarulo | Feb. 8, 1949 |